United States Patent [19]

Nocentino, Jr. et al.

[11] Patent Number: 5,426,554

[45] Date of Patent: Jun. 20, 1995

[54] AUDIO BANDWIDTH INTERFACE APPARATUS FOR PILOT WIRE RELAYS

[75] Inventors: Albert Nocentino, Jr., 9140 Verree Rd., Philadelphia, Pa. 19115; James E. Waldron, Drexel Hill, Pa.

[73] Assignee: Albert Nocentino, Jr., Philadelphia, Pa.

[21] Appl. No.: 26,117

[22] Filed: Mar. 3, 1993

Related U.S. Application Data

[63] Continuation of Ser. No. 671,497, Mar. 19, 1991, abandoned.

[51] Int. Cl.⁶ .............................................. H02H 3/00
[52] U.S. Cl. ................................... 361/64; 361/66; 361/68
[58] Field of Search .............................. 361/64, 66, 68

[56] References Cited

U.S. PATENT DOCUMENTS

| | | | |
|---|---|---|---|
| 3,225,256 | 12/1965 | Carter et al. | 317/28 |
| 3,707,651 | 12/1972 | Lensner et al. | 317/28 |
| 4,234,901 | 11/1980 | Strickland, Jr. | 361/64 |
| 4,275,429 | 6/1981 | Church et al. | 361/64 |
| 4,464,697 | 8/1984 | Sun | 361/64 |
| 4,561,120 | 12/1985 | Andow et al. | 455/612 |
| 4,620,257 | 10/1986 | Sano et al. | 361/68 |
| 4,675,774 | 6/1987 | Gonnam et al. | 361/64 |
| 4,675,775 | 6/1987 | Sun et al. | 361/64 |
| 4,751,604 | 6/1988 | Wilkinson | 361/68 |
| 4,782,421 | 11/1988 | Johns et al. | 361/65 |
| 4,935,837 | 8/1990 | Sun | 361/64 |

*Primary Examiner*—Marc S. Hoff
*Assistant Examiner*—S. Jackson
*Attorney, Agent, or Firm*—William H. Murray

[57] ABSTRACT

In a pilot wire relay electrical power distribution protection system, an audio band interface apparatus acquires a Hz pilot wire signal from the pilot wire relay and produces signals having frequencies within the frequency band pass of fibre optic communication channels. The apparatus enables pilot relays, which previously communicated over hard wire connections such as dedicated telephone lines, to communicate through a fibre optic communication channel without the necessity for extensive modifications to the pilot wire relay.

2 Claims, 10 Drawing Sheets

FIG. 3A
1/60 SEC. = 16.667MS

FIG. 6M
IN-PHASE FAULT

FIG. 6N

FIG. 6M
OUT-PHASE NORMAL OPERATION 180°

| SIGNAL CAN BE HIGH OR LOW | COMUNICATION CHANNEL MONITOR |

FIG. 6P

| OUT OF PHASE = HIGH (NORMAL) | TIME t₁ | IN PHASE (TRIP) |

FAULT

AUDIO BANDWIDTH INTERFACE APPARATUS FOR PILOT WIRE RELAYS

This is a continuation of application Ser. No. 07/671,497 filed on Mar. 19, 1991 now abandoned.

BACKGROUND OF THE INVENTION

The present invention relates to electrical power distribution systems and more particularly to apparatus for protecting electrical power distribution lines and equipment.

Protection of power lines and power line distribution equipment is key to providing constant service to all utility customers. In order to have a safe reliable system of power distribution, protective relaying is utilized. To prevent permanent costly damage from occurring to the distribution networks of the utilities, the protective relaying system must be able to clear short-term faults and isolate the protected zone during phase-to-ground and three phase faults quickly and reliably. One method of providing this protection is pilot wire relay protection.

Pilot wire relay protection typically utilizes two electro-mechanical relays, one at each end of a protected zone, and a communication channel connecting these relays. Typically, the communication channel is a dedicated telephone line provided by the telephone company. The power companies either lease or purchase these dedicated telephone lines. The dedicated telephone line, which in the past consisted of wires, is the path that the two relays use to communicate. This proved to be very effective in performing pilot wire relay type protection of electrical power distribution lines because the hard wired telephone communication channels allowed for simple current flow across the pilot wire which would close the relays and trip the associated circuit breakers thereby isolating the fault in the electrical power distribution system.

However, with the perfection of the fibre optic communication channels, the telephone companies have been upgrading their systems by replacing hard wired telephone communication lines with the fibre optic communication channels. Such upgrading presents problems for the power companies which utilize pilot wire relay protection. With the installation of the fibre optic communication channel, there is no longer a wire communication channel over which the current can flow. In addition, the fibre optic communication channels being used by telephone companies have a limited bandwidth, in the audio band of approximately 300 to 3200 Hz. The signals which typical pilot wire relays produce occur at 60 Hz. Since such signals are below the lower limit of the bandwidth of the fibre optic communication channel, they will not be transmitted across a communication channel of this type.

It is therefore an object of the present invention to provide an apparatus which will enable pilot wire relay devices to communicate across a fibre optic communication channel.

It is another object of the present invention to provide an apparatus for enabling existing pilot wire relay devices to communicate across the fibre optic communication channel without replacing such pilot wire relay devices.

It is still another object of the present invention to provide an apparatus for enabling existing pilot wire relay type devices to communicate across fibre optic communication channels without the need for internal modifications to the existing pilot wire relay devices, These and other objects of the present invention will become apparent to those skilled in the art upon consideration of the following description of the invention,

SUMMARY OF THE INVENTION

The present invention comprises an audio band interface apparatus which acquires a 60 Hz pilot wire signal from an existing pilot wire type relay and produces signals having frequencies which are within the frequency bandpass of fibre optic communication channels. The apparatus of the present invention enables the creation of a valid communication path between two pilot wire type relays regardless of whether the communication path comprises the fibre optic communication channel, a hard wired communication channel or a mixed fibre optic/hard wired communication channel.

BRIEF DESCRIPTION OF THE DRAWINGS

FIGS. 3 A through FIG. 3 H depict the forms of various signals occurring within a local signal input portion of the audio band interface apparatus in accordance with the present invention.

DETAILED DESCRIPTION

Figure 1:
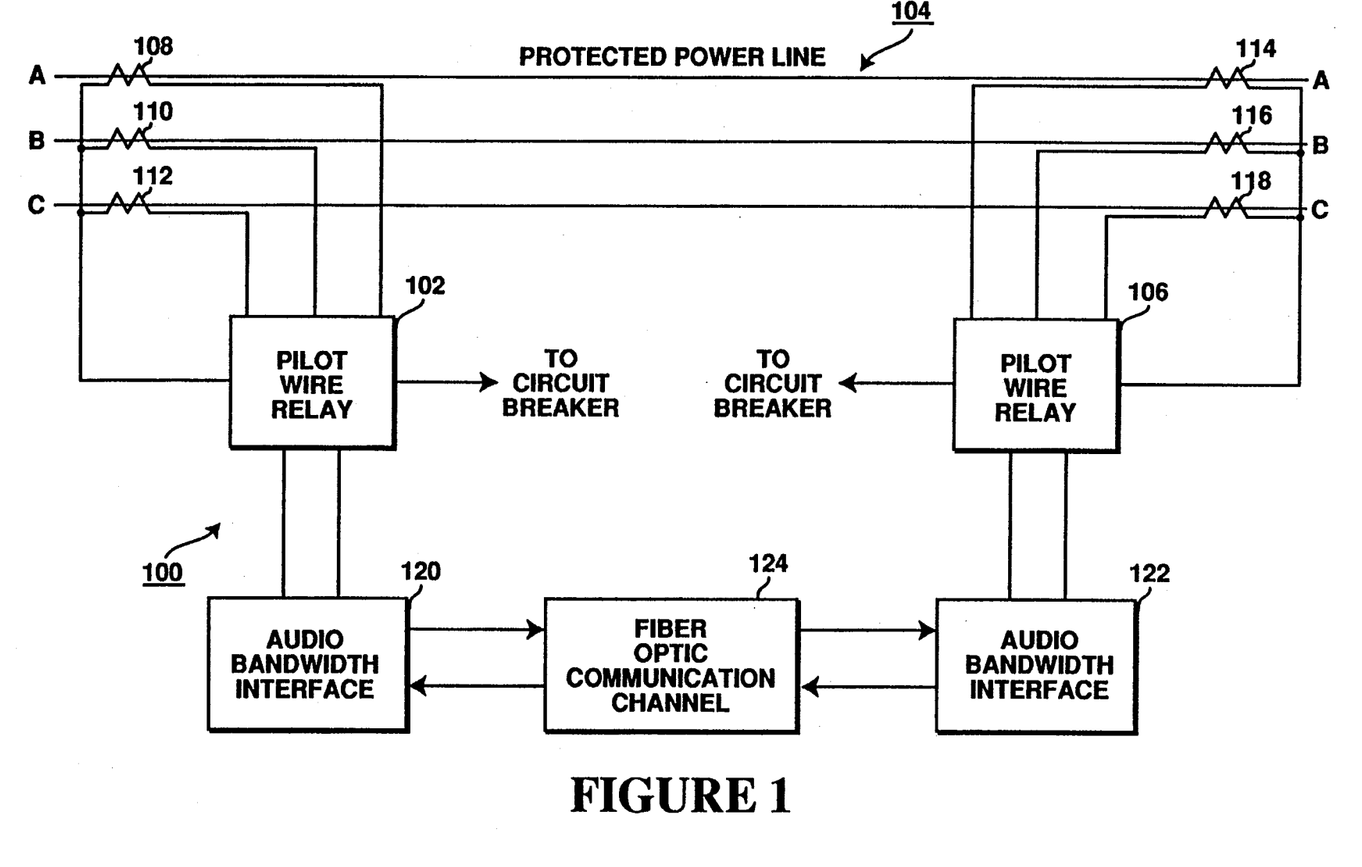
FIG. 1 is a functional block diagram of a pilot wire communication system utilizing audio band interface apparatuses in accordance with the present invention.

Referring now to FIG. 1, there is shown a functional block diagram of a pilot wire relay system, generally designated 100, utilizing an audio band communication channel, such as, for example, a fibre optic communication channel, and an audio bandwidth interface apparatus in accordance with a preferred embodiment of the present invention. Although this detailed description sets forth the use of a fibre optic communication channel as an exemplary form of audio band communication channel, any other type of audio band communication channel may be utilized such as, for example, a hard wire connection, a telephone line or a mixed fibre optic/hardwired communication channel and such are considered to be within the scope of the present invention. The system 100 includes a first pilot relay 102 positioned at one end of a protected zone of a three phase power distribution line generally designated 104. The three phase power distribution line 104 comprises an A phase, a B phase and a C phase as is known in the art of electrical power distribution. A second pilot wire relay 106 is positioned at the other end of the protected zone of the three phase power distribution line 104.

Current in each of the three phases at one end of the protected zone of the power distribution line 104 is monitored by, for example, three current transformers 108, 110 and 112 as is known in the art. Signals representative of each of these three currents are generated by the current transformers and applied to the first pilot wire relay 102 as is also known in the art. Current flowing at the other end of the protected zone of the three phase electrical power distribution line 104 is sensed by current transformers 114, 116 and 118. Signals from these current transformers, representing the three phase currents flowing at the other end of the protected zone are coupled to the second pilot wire relay 106. The first 102 and second 106 pilot wire relays utilize the signals from the current transformers 108, 110, 112, 114, 116 and 118 to detect faults on the electrical power distribution line 104; and provide output signals for tripping circuit breakers when the fault occurs within the protected zone as is known to those skilled in the art of protective relaying for electrical power distribution systems.

A first audio bandwidth interface apparatus 120 is electrically connected to the first pilot wire relay 102. A second audio bandwidth interface apparatus 122 is electrically connected to the second pilot wire relay 106. A fibre optic communication channel 124 is connected between the audio bandwidth interface apparatuses 120 and 122. The fibre optic communication channel 124 converts light signals which have been transmitted over a fibre optic medium into appropriate electrical output signals as is known to those skilled in the art of fibre optic communication channels. These electrical output signals are coupled to the audio bandwidth interface apparatuses 120 and 122. The fibre optic communication channel 124 receives electrical signals from the audio bandwidth interface apparatuses 120 and 122 and converts these electrical signals into appropriate light signals for transmission over the fibre optic medium as is known to those skilled in the art of fibre optic communication channels.

Figure 2:
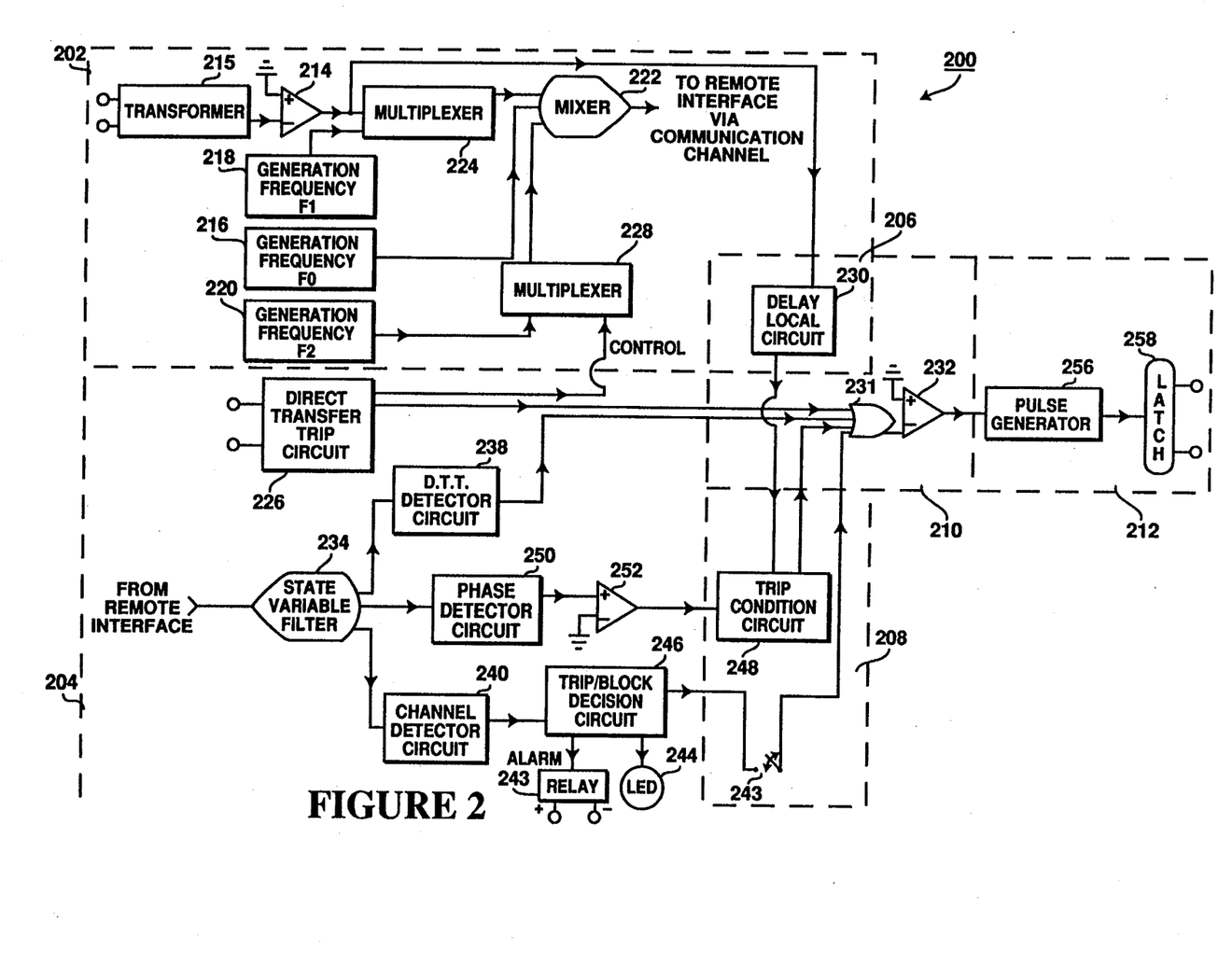
FIG. 2 is a functional block diagram of a preferred embodiment of the audio band interface apparatus of the present invention.

The first audio bandwidth interface apparatus 120 is depicted in more detail in FIG. 2. In the preferred embodiment, the second audio bandwidth interface apparatus 122 is the same as the first apparatus 120. Therefore, the description of the first apparatus 120 which follows is also applicable to the second apparatus 122. For purposes of this detailed description, the audio bandwidth interface apparatus depicted in FIG. 2, generally referred to as 200, is divided into six portions which are a local signal input portion 202; a remote signal input portion 204; a local signal delay portion 206; a logic comparison portion 208; a counter and inverting portion 210; and an output portion 212. In FIG. 2, each portion is circumscribed by a dotted line which contains the component parts of that portion.

Figure 3A:
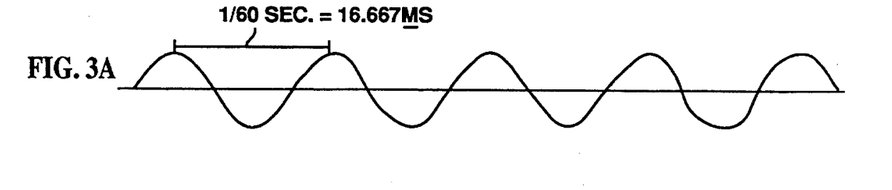
Figure 3B:
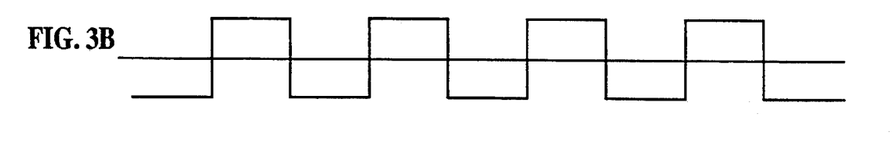

The local output signal from the local pilot wire relay (102 for apparatus 120 and 106 for apparatus 122) is coupled to the input of an inverting squaring amplifier 214 of the local signal input portion 202 through a transformer 215. In this detailed description, the term local refers to the pilot wire relay on the same side of the communication channel 124 as the audio bandwidth interface apparatus; and the term remote refers to the pilot wire relay located on the other side of the communication channel 124. The local signal is in the form of a 60 Hz sine wave, having a period of 16.667 ms as depicted in FIG. 3A. The inverting squaring amplifier 214 inverts and squares the input signal producing an output signal in the form of a 60 Hz square wave that is positive whenever the input signal is negative; and negative whenever the input signal is positive as depicted in FIG. 3B and compared with 3A.

A first oscillator 216 generates a sine wave signal having a frequency of $F_0$. A second oscillator 218 generates a sine wave signal having a frequency of $F_1$. A third oscillator 220 generates a sine wave signal having a frequency of $F_2$. Each of the frequencies $F_0$, $F_1$ and $F_2$ preferably lie within the audio tone range of 300–3200 $H_z$. The frequency $F_1$ is higher than that of the frequency $F_0$ and lower than that of the frequency $F_2$. In the preferred embodiment, frequency $F_0$ is 1,000 Hz; frequency $F_1$ is 1,900 Hz; and frequency $F_2$ is 2,500 Hz.

Figure 3C:
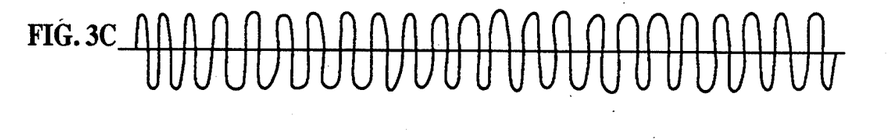
Figures 3D, 3E:
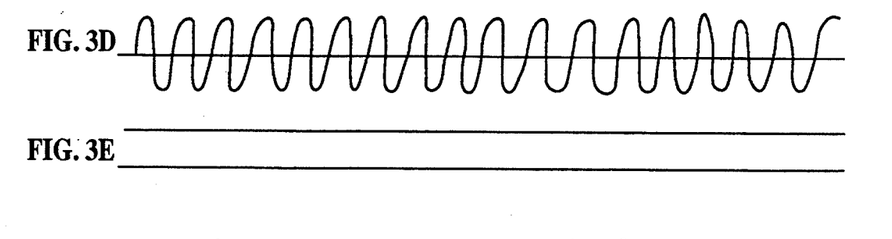
Figure 3F:
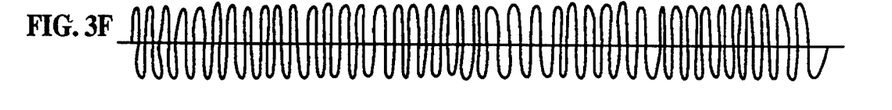

The output of the first oscillator 216, which is the signal depicted in FIG. 3D, is coupled to one input of a three input mixer 222. The three input mixer 222 mixes the signals applied to its inputs and produces an output signal which is a mixed composite of the signals applied to the inputs. The peak to peak amplitude of the output signal is preferably limited to a predetermined value. The output of the second oscillator 218, which is the signal depicted in FIG. 3C, is coupled to the signal input of a multiplexer 224. The multiplexer 224 is preferably a Motorola Semiconductor, Inc. type MC 14066 Quad Multiplexer. The multiplexer 224 switches the signal applied to its input terminal to an output terminal upon application of a positive signal to a control terminal.

Figure 3G:
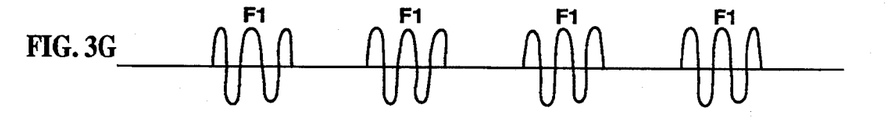
Figure 3H:
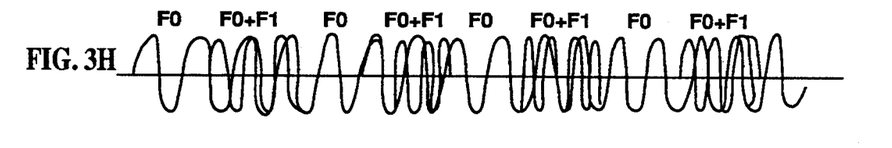

The output of the inverting squaring amplifier 214 is coupled to the control terminal of the multiplexer 224. The output of the multiplexer 224, controlled by the output signal from the inverting squaring amplifier 214, is that portion of the signal $F_1$ which occurs during the positive excursion of the square wave signal output from the amplifier 214 as shown in FIG. 3G. The output of the multiplexer 224 is coupled to a second input of the three input mixer 222. The mixer 222 mixes the output signals from the first oscillator 216 and the multiplexer 224 and produces an output signal, which is a composite of the signals from the first oscillator 216 and the multiplexer 224 as depicted in FIG. 3H. The output signal from the mixer 222 preferably has an amplitude which is limited to the maximum value permitted by the communication channel, for example 2 volts peak to peak. The output signal from the mixer 222 is coupled to the remote audio bandwidth interface apparatus through the communication channel 124.

A direct transfer trip (DTT) signal from the local pilot wire relay is coupled to the control input of a relay 226. Typically, the DTT signal is a DC signal generated by the utility and is applied to a protective relay in order to cause the relay to produce a trip signal which trips the circuit breaker(s) associated with this relay. Upon receipt of DTT signal from the utility, the contacts of the relay 226 close and apply a positive voltage (a logical "1") to the control terminal of a second multiplexer 228. In the preferred embodiment, the second multiplexer is the same type as the first multiplexer 224. In the preferred embodiment, there is a predetermined delay (preferably 4–10 mSec) between receipt of the DTT signal from the utility and the closing of the contacts of relay 226. There is also a predetermined delay (preferably 50–100 mSEC) between removal of the DTT signal and the opening of the contacts of the relay 226.

The output of the third oscillator 220 is coupled to the signal input of the second multiplexer 228. Accordingly, when a positive voltage is applied to the control terminal of the second multiplexer 228 from the direct transfer trip circuit 226, the signal present at the signal input of the multiplexer 228 is switched to its output terminal. The output of the second multiplexer 228 is coupled to a third input of the mixer 222.

The output of the inverting squaring amplifier 214 is also coupled to the input of a local signal delay circuit 230 of the local signal delay portion 206. In the preferred embodiment, the local signal delay circuit 230 comprises an EG&G Reticon type RD5106A/RD5107A analog delay line. The signal at the output of the local signal delay circuit 230 is delayed by a predetermined amount following application of the signal to its input. In the preferred embodiment, the predetermined delay is equal to delay of the signal received from the remote audio bandwidth apparatus which is due to the communication channel 124. The signal from the contacts of the relay 226 is also coupled to one input of a four input OR gate 231. The output of the four input OR gate 231 is coupled to the input of an inverting amplifier 232.

The signal from the mixer 222 of the remote pilot wire relay is coupled to the input of a state variable filter 234 of the remote signal input portion 204 of the local pilot wire relay. The state variable filter 234 is preferably a National Semiconductor type AF100 Universal Active Filter which has high pass, bandpass and low pass outputs. The high pass portion passes the frequency $F_2$ to the high pass output. The high pass output of the filter 234 is connected to the input of a direct trip transfer (DTT) detector circuit 238. Accordingly, the signal $F_2$, if present at the input of the state variable filter 234, is coupled to the input of the DTT detector circuit 238 through the high pass portion of the filter 234. Upon detection of the frequency $F_2$ at its input, the DTT detector circuit 238 produces a positive voltage (logical "1") signal at its output. The output of the DTT detector circuit 238 is connected to an input of the four input OR gate 231.

The low pass portion of the state variable filter 234 passes the frequency $F_0$ through to the low pass output. The low pass output of the filter 234 is coupled to the input of a channel detector circuit 240. The channel detector circuit 240 produces a positive voltage (logical "1") signal at its output upon detection of the signal $F_0$ at its input; and a zero voltage (logical "0") signal upon interruption or absence of the signal $F_0$ at its input. The output of the channel detector circuit 240 is connected to the input of a trip/block decision circuit 246.

Figure 8:
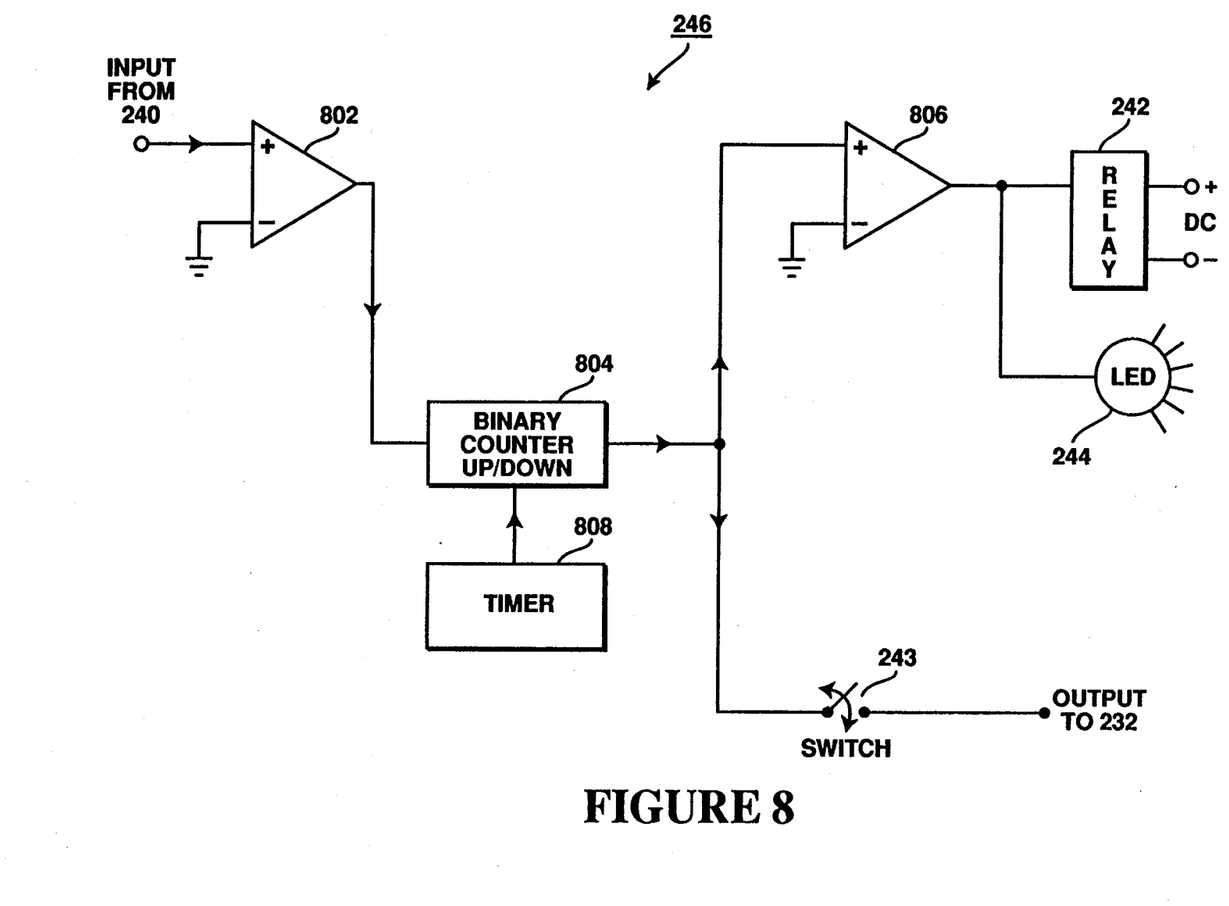
FIG. 8 is a schematic block diagram of a preferred embodiment of a trip/block decision circuit employed in the apparatus of the present invention.

Referring now to FIG. 8, there is shown a schematic block diagram of the trip/block decision circuit 246. The circuit 246 comprises an operational amplifier 802 which receives, at its non-inverting input, the output signal from the channel detector circuit 240. The output of the first operational amplifier 802 is connected to the input of a binary up/down counter 804. In the preferred embodiment, the binary up/down counter 804 is a National Semiconductor type CD40193BM/CD40193BC Synchronous 4-Bit Up/Down Binary Counter. It is constantly reset by a high (logical "1") input from the channel detector circuit 240, through the first operational amplifier 802, when the communication channel is functioning as indicated by a positive voltage output from the channel detector circuit 240. When the output of the channel detector circuit 240 changes state from a logical "1" to a logical "0", indicating a malfunction in the communication channel 124, the binary up/down counter 804 begins counting. When the counter reaches a certain predetermined number (for example 8), it will generate a positive voltage (logical "1") signal at its output.

The output of the binary up/down counter 804 is coupled to the latching coil of a latching relay 242 and a visual alarm indicator 244 through a second amplifier 806. The output of the binary up/down counter 804 is also coupled one input of the four input OR gate 231 through a switch 243. A clock output of a timer 808 is coupled to a count up input of the binary up/down counter 804. In the preferred embodiment, the timer 808 is a National Semiconductor Type LM556 Dual Timer. The timer 808 determines how fast the binary up/down counter 804 will count. The timer is adjustable and controls the speed of the counter over a range, which is preferably from 500 uSec to 2 hours.

Figure 10:
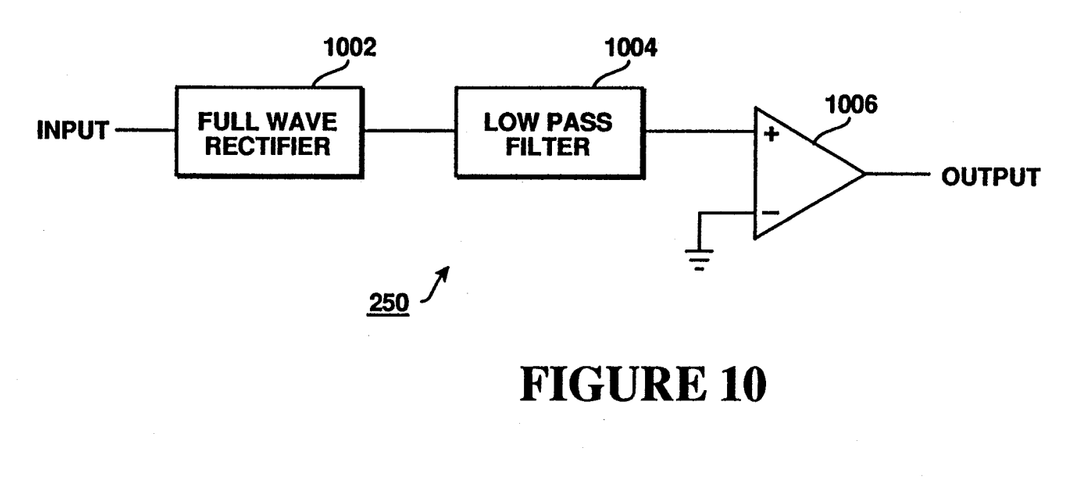
FIG. 10 is a functional block diagram of a preferred embodiment of a phase detector circuit employed in the apparatus of the present invention.

The bandpass output of the state variable filter 234 is coupled to the input of a phase detector circuit 250. In the preferred embodiment, as depicted in FIG. 10, the phase detector circuit 250 comprises a full wave rectifier 1002 the output of which is coupled to the input of a low pass filter 1004. The output of the low pass filter 1004 is coupled to the non-inverting input of an operational amplifier 1006. When the signal applied to the input of the circuit 250 is of the form shown in FIG. 4K, the output signal produced by the full wave rectifier 1002 will be a full wave rectified signal. The full wave rectified signal is then filtered by the low pass filter 1004 to produce a signal having the form depicted in FIG. 4L. This signal is then coupled to the squaring amplifier 252 through operational amplifier 1006. The squaring amplifier 252 filters and converts the signal from the output of the operational amplifier 1006 to a square wave signal having the form depicted in FIG. 4M. The square wave signal from the output of the squaring amplifier 252 is coupled to a remote input of a trip condition circuit 248. The output of the local signal delay circuit 230 of the local signal delay portion 206 is coupled to a local input of the trip condition circuit 248.

Figure 9:
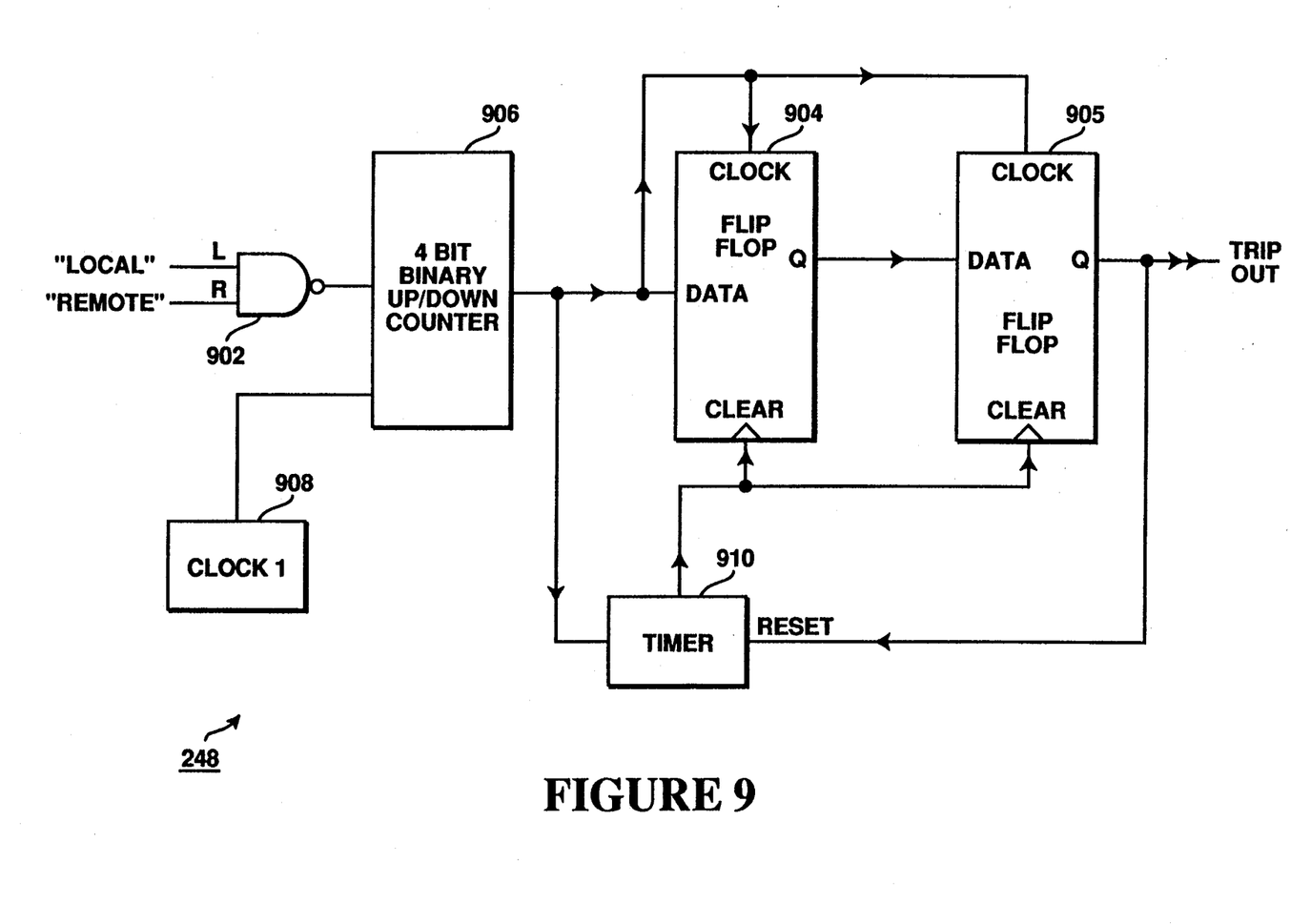
FIG. 9 is a schematic block diagram of a preferred embodiment of a trip condition circuit employed in the apparatus of the present invention.

Referring now to FIG. 9, there is shown a schematic block diagram of a preferred embodiment of the trip condition circuit 248. The trip condition circuit 248 includes a NAND gate 902. In the preferred embodiment, the NAND gate 902 is a National Semiconductor type MM54HC03 NAND gate. One input of the NAND gate comprises the local input to the circuit 248 and the other input of the NAND gate 902 comprises the remote input to the circuit 248. The signal coupled to the local input of the circuit 248 is also coupled to the data and clock inputs of a first flip flop 904 and the clock input of a second flip flop 905. The Q output of the first flip flop 904 is connected to the data input of the second flip flop 905. In the preferred embodiment, the flip flops 904 and 905 are National Semiconductor type MM54HC74A Dual D Flip Flop With Preset and Clear. The output of the NAND 902 is coupled to the input of a binary counter 906. In the preferred embodiment, the binary counter 906 is a Motorola type MC14516.

A clock generator 908 is coupled to the clock input of the binary counter 906. In the preferred embodiment, the clock generator 908 is a National Semiconductor type LM555 timer. The output of the binary counter 906 is coupled to the data input of the flip flop 904 and the trigger input of a timer 910. In the preferred embodiment, the timer 910 is a National Semiconductor type LM556 Dual Timer. The output of the timer 910 is coupled to the clear input of the first flip flop 904 and the clear input of the second flip flop 905. The Q output of the second flip flop 905, which is also the trip output of the circuit 248, is coupled to the reset input of the timer 910. The trip output of the trip condition circuit 248 is coupled to a fourth input of the four input OR gate 231.

The output of the NAND gate 902 will be high (positive voltage) whenever one or both of the input signals are low. When both of the input signals are high, the output of the NAND gate 908 will be low. When the input signal to the binary counter 906 from the NAND gate 902 is high, the counter 906 will be reset and will not be permitted to count. Consequently, under such condition, the counter 906 will never reach its predetermined count at which the output of the counter 906 would change state from low to high. When the input signal to the binary counter 906 from the NAND gate 902 is low, the counter 906 will be permitted to count; and, if the input signal remains low long enough, the counter will reach its predetermined count at which time the output of the counter 906 will change from low to high.

The clock 908 provides a clock signal to the binary counter 906 which enables the counter 906 to count at a predetermined rate. Thus it can be seen that the input signals to the NAND gate 902 must both be high (that is, in phase as will be subsequently described) for a predetermined period of time, which time is set by the frequency of the clock 908 and the predetermined count which must be reached by the binary counter 906, before the counter 906 will produce a change in state at its output from a low to a high signal.

The change in state of the output signal from the binary counter 906 is coupled to the data and clock inputs of the first flip flop 904, the clock input of the second flip flop 905 and the input to the timer 910. This change in state signal causes the Q output of the first flip flop 904 to change state from low to high. The Q output of the second flip flop 905 remains low since a low signal was present at its input when the clock pulse was received. This change in state of the signal output from the binary counter 906 also activates the timer 910. If the timer 910 does not receive a second high output signal from the binary counter 906 within a predetermined period of time, the timer 910 will generate a reset pulse at that time, which resets the first and second flip flops 904 and 905 causing their Q outputs to be reset to low.

If the binary counter 906 generates a second high output signal within the predetermined time period, the timer 910 will not have had time to generate the reset pulse to reset the flip flops 904 and 905. Accordingly, this second high signal applied to the data and clock inputs of the first flip flop 904 and the clock input of the second flip flop 905, will cause the Q output of the first flip flop 904 to change state from high to low. However, because a high signal was present at the data input of the second flip flop 905 when the clock pulse was received from the counter 906, the Q output of the second flip flop 905 will change state from low to high upon receipt of the clock pulse from the counter 906. Since this signal is also coupled to the reset input of the timer 910, the timer 910 will reset thereby allowing the Q output of the second flip flop 905 to remain high.

The output of the OR gate 231 is coupled to the input of the inverting operational amplifier 232. The output of the inverting operational amplifier 232 is coupled to the input of a one shot pulse generator 256 of the output portion 212. The one shot pulse generator 256 produces a pulse having a predetermined duration upon the change of state (from a positive voltage to a negative voltage in the preferred embodiment) of the input signal (see FIG. 7s). The output of the one shot pulse generator 256 is electrically connected to a latching coil of a latching relay 258. An output pulse from the one shot pulse generator 256 applied to the latching coil of the latching relay 258 causes the normally open contacts of latching relay to close thereby applying an activating voltage to the power line circuit breakers causing them to trip.

The audio bandwidth interface apparatus operates as follows. First, assuming that neither of the pilot wire relays 102 and 106 have detected a fault, the signals generated by the relays 102 and 106 will be 60 Hz sine waves which are 180 degrees out of phase with respect to each other as is known to those skilled in the pilot wire protective relay art. The signal received by the local signal input portion 202 of the audio bandwidth interface apparatus is a 60 Hz sine wave as depicted in FIG. 3A. The input signal is converted into a 60 Hz square wave as depicted in FIG. 3B by the inverting squaring amplifier 214. The square wave is substantially 180 degrees out of phase with the input sine wave as previously described and as shown by the relative phase relationship of the waveforms depicted in FIGS. 3A and 3B. The 60 Hz square wave signal is applied to the control terminal of the multiplexer 224 thereby switching the signal $F_1$ from the second oscillator 218 to the mixer 222 during the positive portions of the 60 Hz square wave signals as previously described. The signal output from the multiplexer 224 is depicted in FIG. 3G. This signal is mixed with the $F_0$ signal generated by the first oscillator 216 resulting in the signal depicted in FIG. 3H.

The signal depicted in FIG. 3H is transmitted to the state variable filter 234 of the remote audio bandwidth interface apparatus through the fibre optic communication channel 124. Similarly, a signal of the type depicted in FIG. 3H is received from the remote audio bandwidth interface apparatus over the fibre optic communication channel 124 and is coupled to the state variable filter 234 of the local audio bandwidth interface apparatus.

Figure 4H:
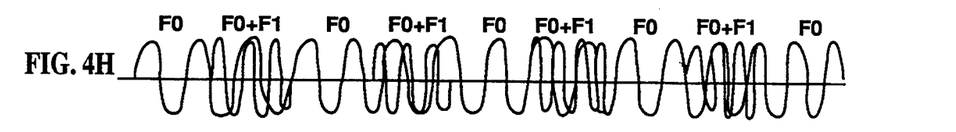
FIG. 4 depicts the waveforms and phase relationships between signals generated in a remote signal input portion of the apparatus of the present invention
Figure 4I:
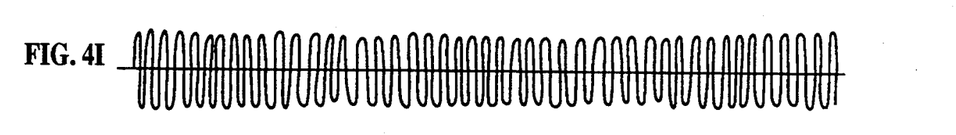
Figure 4J:
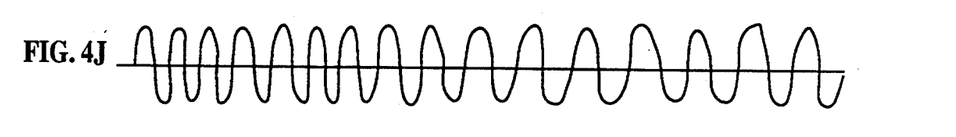
Figure 4K:
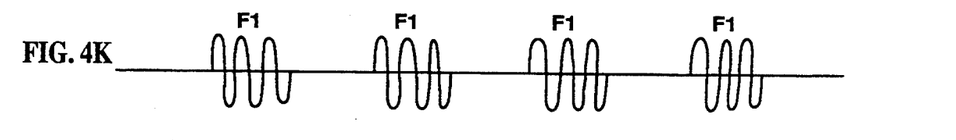
Figure 4L:
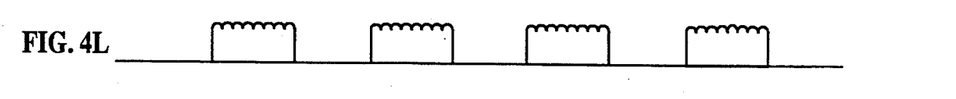
Figure 4M:
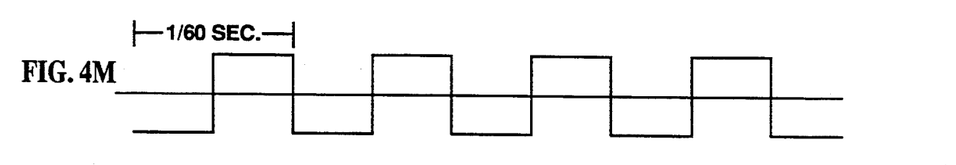
Figure 5B:
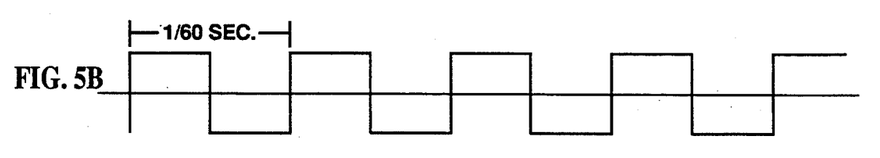
FIG. 5 depicts the waveform of a signal generated in the local signal delay portion of the apparatus of the present invention, and the phase relationship of that signal to the squared and inverted input signal of the apparatus of the present invention.
Figure 5N:
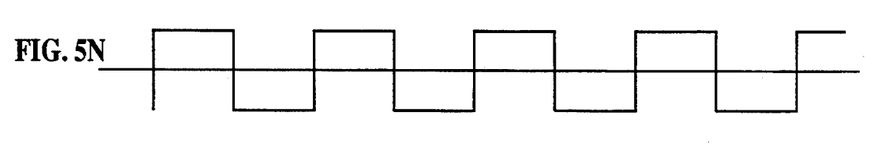
Figure 6M:
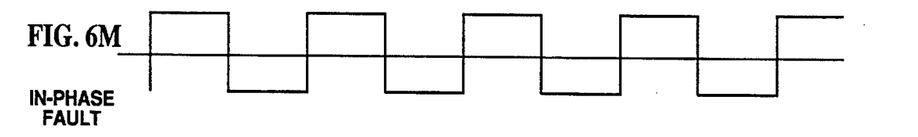
FIG. 6 depicts waveforms of signals utilized and generated in the trip condition circuit portion of the apparatus of the present invention as well as phase relationships between such signals during normal operation and fault detection operation.
Figure 6N:
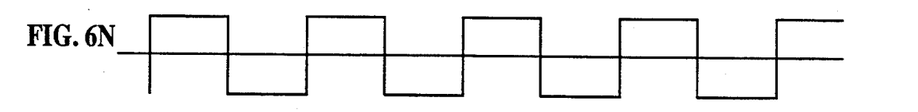
Figure 6O:
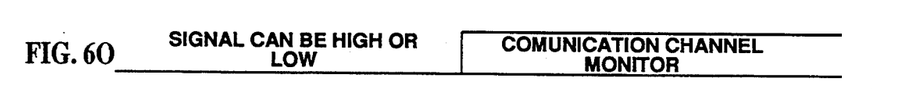
Figure 6P:
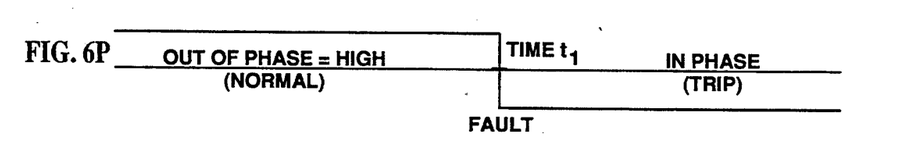

The output of the bandpass portion of the state variable filter 234 is the signal $F_1$ which is repeated periodically as depicted in FIG. 4K. This signal is reconstructed to the waveform depicted in FIG. 4L by the phase detector circuit 250. The signal depicted in FIG. 4L is coupled to the input of the squaring amplifier 252. The output of the squaring amplifier 252 is a square wave as depicted in FIG. 4M which is the square wave generated by the inverting squaring amplifier 214 of the remote audio bandwidth interface apparatus as reconstructed by the local audio bandwidth interface apparatus. The signal depicted in FIG. 4M is coupled to the remote input of the trip condition circuit 248.

As previously described, the input signal from the local pilot wire relay is squared by the inverting squaring amplifier 214 and coupled to the local signal delay circuit 230. The local signal delay circuit 230 delays the square wave signal received from the inverting squaring amplifier 214 for a time which is substantially equal to the time that it takes the signal from the mixer 222 of the remote audio bandwidth interface apparatus to be transmitted over the communication channel 124 to the local audio bandwidth interface apparatus and to be reconstructed into the square wave output from the squaring amplifier 252.

As previously stated, a signal of the type depicted in FIG. 3H is received from the remote bandwidth interface apparatus over the fibre optic communication channel 124 and is coupled to the state variable filter 234. The output of the low pass portion of the state variable filter 234 is the signal $F_0$ which is depicted in FIG. 4J. The $F_0$ signal from the low pass portion of the state variable filter 234 is applied to the channel detector circuit 240. Since the signal $F_0$ is present at the input of the channel detector circuit 240, the output of the circuit 240 is high (a logical "1") as previously described. This high signal output from the channel detector circuit 240 is coupled to the input of the trip/block decision circuit 246. Since the input to the circuit 246 is high, the output of the binary up/down counter 804 (see FIG. 8) of the circuit 246 is low. Consequently, no visual alarm or alarm relay contact closure is generated.

The trip condition circuit 248 compares the phase of the square wave output from the local signal delay circuit 230 with the square wave output form the squaring amplifier 252 (the reconstructed signal received from the remote audio bandwidth interface apparatus). As previously described, the square wave output from the local signal delay circuit 230 is coupled to one input of the NAND gate 902; and the square wave output from the squaring amplifier 252 is coupled to the other input of the NAND gate 902 (see FIG. 9). Since a no fault condition has been assumed, the square wave outputs from the local signal delay circuit 230 and the squaring amplifier 252 will be 180 degrees out of phase. Consequently, the output of the NAND gate 902 will be a high signal. Since the output of the NAND gate 902 remains high during the no fault condition, the counter will not be permitted to count to its predetermined number. Consequently, the output of the counter 906 will remain low as will the outputs of the first flip flop 904 and the second flip flop 905. Accordingly, the trip output signal applied to the OR gate 231 will remain low.

Assuming that there is no fault in the protective equipment; that is, the remote audio bandwidth interface apparatus is generating the frequency $F_0$, which frequency is being received by the local audio bandwidth interface apparatus through the fibre optic communication channel 124, the signal $F_0$ will be applied to the input of the state variable filter 234; passed through the low pass portion of the filter 234; and applied to the input of the channel detector circuit 240. Since the signal $F_0$ is present at the input of the channel detector circuit 240, the output of the circuit 240 is high as previously described. This high signal output from the channel detector circuit 240 is coupled to the input of the trip/block decision circuit 246. Since the input to the circuit 246 is high, the output of the binary up/down counter 804 (see FIG. 8) of the circuit 246 is low as previously described. Consequently, no visual alarm or alarm relay contact closure is generated; and the signal applied to the input of the OR gate 231 from the output of the trip/block decision circuit 246 remains low.

Assuming also that no direct transfer trip signal has been received from the local utility, the frequency $F_2$ will not be mixed with the signal received from the mixer 222 of the remote audio bandwidth interface apparatus through the communication channel 124. Accordingly, this signal will not appear at the input of the state variable filter 234 of the local audio bandwidth apparatus. Consequently, there will be no $F_0$ frequency signal applied to the input of the direct transfer trip detector circuit 238. As a result, the output of the direct transfer trip detector circuit 238, which is coupled to an input of the OR gate 231, will remain low. Since it is assumed that there has been no direct transfer trip signal received from the utility, the output of the direct transfer trip circuit 226, which is also coupled to an input of the OR gate 231, will remain low.

Since there are no high signals applied to the inputs of the OR gate 231, the output of the OR gate 231 will remain low. This low signal is coupled to the input of the inverting operational amplifier 232 causing a high signal to appear at the output. The high signal appearing at the output of the inverting operational amplifier 232 is coupled to the input of the one shot circuit 256. Since there is no change of state in the input signal to the one shot 256, the output from the one shot 256 will remain low; consequently, the latches 258 will not operate.

Assuming now that a fault occurs within the protected zone; that is, between the local and the remote pilot wire relays 102 and 106 depicted in FIG. 1. Since a fault has occurred between the local and remote pilot wire relays, the signals generated by the relays 102 and 106 will be 60 Hz sine waves which are in phase with respect to each other as is known to those skilled in the pilot wire protective relay art. The signal received by the local signal input portion 202 of the audio bandwidth interface apparatus is a 60 Hz sine wave as depicted in FIG. 3A. As previously described, the input signal is converted into a 60 Hz square wave which is substantially 180 degrees out of phase with the input sine wave as shown by the relative phase relationship of the waveforms depicted in FIGS. 3A and 3B. The 60 Hz square wave signal is applied to the control terminal of the multiplexer 224 thereby switching the signal $F_1$ from the second oscillator 218 to the mixer 222 during the positive portions of the 60 Hz square wave signals.

The signal output from the multiplexer 224 is mixed with the $F_0$ signal generated by the first oscillator 216 resulting in the signal depicted in FIG. 3H which is transmitted to the state variable filter 234 of the remote audio bandwidth interface apparatus over the fibre optic communication channel 124. Similarly, a signal of the type depicted in FIG. 3H is received from the remote bandwidth interface apparatus over the fibre optic communication channel 124 and is coupled to the state variable filter 234 of the local audio bandwidth interface apparatus.

That portion of the signal received from the remote bandwidth interface apparatus having the frequency $F_1$ passes through the band pass portion of the state variable filter 234 and is reconstructed into the signal depicted in FIG. 4M by the phase detector circuit 250 and the squaring amplifier 252. As previously described, the input signal from the local pilot wire relay is squared by the inverting squaring amplifier 214 and is delayed by the local signal delay circuit 230 before being applied to the local input of the trip condition circuit 248.

Since it is assumed that there are no defects in the audio bandwidth interface or communication channel equipment, the low frequency component $F_0$ of the signal received from the remote audio bandwidth interface apparatus passes through the low pass portion of the state variable filter 234 and is applied to the input of the channel detector circuit 240. Since the signal F appears at the input of the circuit 240, the output of the circuit 240 is high as previously described. This high signal output from the channel detector circuit 240 is coupled to the input of the trip/block decision circuit 246. Since the input to the circuit 246 is high, the output of the circuit 246 is low as also described previously. Consequently, no visual alarm or alarm relay contact closure is generated, and a low signal is coupled to the OR gate 231 through the switch 243. Also, since it is assumed that a direct transfer trip signal has not been received from the utility, the output from the direct transfer trip circuit 226 and the direct transfer trip detection circuit 238, which are coupled to inputs of the OR gate 231, will remain low.

Since a fault in the protected line has been assumed, the reconstructed remote square wave signal is in phase with the delayed local signal. Accordingly, there will be a coincidence of high signals at the inputs of the NAND gate 902 (see FIG. 9). During this coincidence of high signals, the NAND gate 902 will produce a low signal output which is coupled to the input of the binary counter 906. As a result, the binary counter 906 will begin counting. The binary counter 906 will continue counting as long as the local and remote inputs to the NAND gate 902 are both high. If they remain high for a predetermined period of time, preferably in the range of approximately 2-4 milliseconds, the binary counter 906 will provide an output signal which changes state from low to high. Since this output signal is coupled to the input of the timer 910, the timer will be started. Also, since the output from the binary up/down counter 906 is also coupled to the data input of the first flip flop 904 as well as the clock inputs of the first flip flop 904 and the second flip flop 905, the change in state of the output signal from the counter 906 from low to high will cause the Q output of the first flip flop 904 to change state from low to high. However, since the data input to the second flip flop 905 was low at the time it receives its clock input from the timer 906, the Q output of the second flip flop 905 will remain low.

If the reconstructed remote square wave signal remains in phase with the delayed local signal for a second consecutive cycle, the NAND gate 902 will again generate a low signal. If the local and remote signals once again remain high for the period of time required to enable the binary counter to count to its predetermined number, the output of the binary counter 906 will change state once again from low to high. The second change of state from low to high in the output of the binary counter 906 will clock the high signal which is present at the data input of the second flip flop 905 to the Q output of the second flip flop 905. This change in state from low to high at the Q output of the second flip flop 905 will cause the timer 910 to reset thereby enabling the Q output of the second flip flop 905 to remain in a high state.

This high Q output signal from the second flip flop 905 is coupled to an input of the OR gate 231 which will cause a high signal to appear at the output of the OR gate 231. Since this high signal from the OR gate 231 is coupled to the input of the inverting operational amplifier 232, the output of the amplifier 232 will change state from high to low which in turn causes the one shot circuit 256 to produce an output pulse which is coupled to the latching coil of the latching relay 258. The output pulse from the one shot circuit 256 will cause the latching relay 258 to latch and it will remain latched until reset. The latched relay 258 in turn activates circuit breakers which open thereby isolating that portion of the power line which is protected by the pilot wire relays.

If the reconstructed remote square wave signal and the delayed local signal do not remain in phase for at least a predetermined period of time (preferably 2-4 milliseconds) during a second consecutive cycle, the low output from the NAND gate 902 which is applied to the input of the binary counter 906 will not remain low long enough to permit the binary counter 906 to reach its predetermined count. Consequently, the output of the binary counter 906 will remain low thereby allowing the timer 910 to reset the first and second flip flops 904 and 905. As a result, the high signal at the data input of the second flip flop 905 will not be clocked to its Q output. Therefore, the OR gate 231 will not receive a high trip output signal from the trip condition circuit 248. Accordingly, the one shot circuit 256 will not produce an output pulse, the latching relay 258 will not latch and the associated circuit breakers will not be activated. Accordingly, it can be seen that the reconstructed square wave signal from the remote audio bandwidth interface apparatus must remain in phase with the delayed local signal for at least a predetermined minimum period of time for at least two consecutive cycles in order for the second flip flop 905 to generate a high trip output signal to the OR gate 231 thereby causing the latching relay to latch and activate circuit breakers which will isolate the protected portion of the power line.

Assuming now that a direct transfer trip signal is received from the local utility. The contacts of the direct transfer trip relay 226 close thereby causing a high signal to be applied to the control terminal of the second multiplexer 228. This enables the frequency $F_2$ from the frequency generator 220 to be applied to the mixer 222. The signal from the mixer 222 is transmitted to the remote audio bandwidth interface apparatus over the communication channel 124. The signal from the transmitter 222 of the remote audio bandwidth interface apparatus, transmitted over the communication channel 124, is applied to the state variable filter 234 of the remote signal input portion 204 of the local audio bandwidth interface apparatus.

Figure 7P:
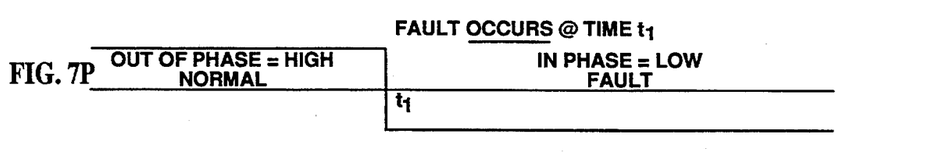
FIG. 7 depicts the waveforms of signals utilized by and generated in a counter and inverting portion and an output portion of the apparatus of the present invention.
Figure 7Q:
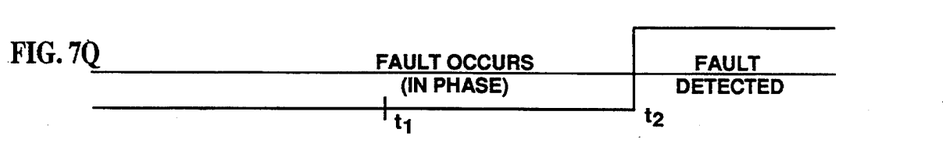
Figure 7R:
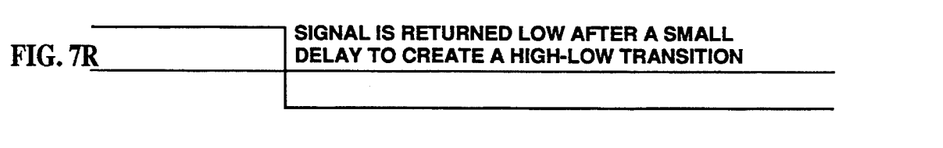
Figure 7S:
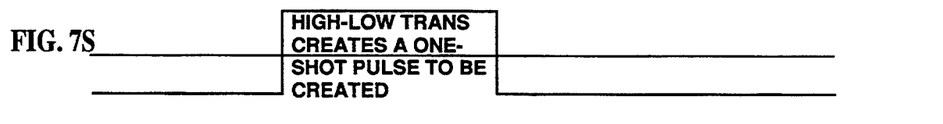
Figure 7T:
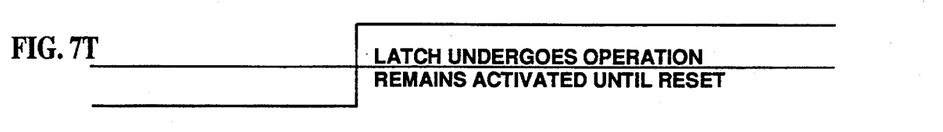
Figure 7U:
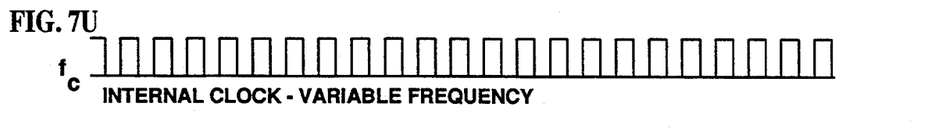

The signal $F_2$ is passed through the high pass portion of the state variable filter 234 and is coupled to the input of the direct transfer trip detection circuit 238. As previously described, upon detection of the frequency $F_2$ at its input, the direct transfer trip detection circuit 238 will produce a high (positive voltage) signal at its output which is coupled to an input of the OR gate 231, which in turn will cause the pulse generator 256 to generate a pulse as shown in FIG. 7S which is applied to the latching coil of the latching relay 258. As previously described, the latching relay 258 will latch upon receipt of the pulse from the one shot 256 and will remain latched until reset thereby activating the associated circuit breakers. Since the direct transfer trip circuit 226 has received a direct transfer trip signal from the utility, it will also generate a high output to an input of the OR gate 231. Such will also cause the latching relay 258 to latch as previously described. Thus it can be seen that the audio bandwidth interface apparatus of the present invention will cause its associated circuit breaker to trip upon receipt of a direct transfer trip signal even if there is a fault in the communication channel 124.

Assuming now that there is a fault in the communication channel which prevents the pilot wire signal from being transmitted from the remote audio bandwidth interface apparatus to the local audio bandwidth interface apparatus. In this case, the signal $F_0$ which is always present in the signal transmitted from the remote audio bandwidth interface apparatus to the local audio bandwidth interface apparatus will be missing. Accordingly, no $F_0$ signal will be applied to the input of the channel detector circuit 240 through the low pass portion of the state variable filter 234. Consequently, the channel detector circuit 240 will generate a low signal which is coupled to the input of the trip/block decision circuit 246. If the output of the channel detector circuit 240 remains low long enough for the binary up/down counter 804 (see FIG. 8) to reach its predetermined count, the output of the binary up/down counter 804 will change state from low to high causing a high signal to be coupled to the OR gate 231 through switch 243; and also causing the visual alarm 244 to illuminate and the contacts of the alarm relay 242 to close thereby producing a DC voltage alarm signal. The high signal coupled to the OR gate 231 will cause the latching relay 258 to latch as previously described thereby activating the associated circuit breakers. Consequently it can be seen that if there is a fault in the communication channel 124, and if that fault remains longer than a predetermined time period, the audio bandwidth interface apparatus of the present invention will generate alarms and cause the associated circuit breaker to trip. Although, in the preferred embodiment, the alarms will always be generated as a result of a fault in the communication channel which remains longer than the predetermined time period, the switch 243 provides the user of the system an option as to whether or not such a fault in the communication channel should generate a trip signal to the OR gate 231. Accordingly, if switch 243 is set by the user to the open position, such a fault in the communication channel will generate alarms but will not cause the associated circuit breakers to trip.

As can be seen from the above detailed description, the present invention provides an apparatus which will enable pilot wire devices to communicate across an audio band communication channel without the need to either replace or modify existing pilot wire relay devices.

While the present invention has been described with reference to a specific embodiment thereof, it will be obvious to those skilled in the art that various changes and modifications may be made to the invention without departing from the invention in its various aspects. It is contemplated in the appended claims to cover all variations and modifications of the invention the come within the true spirit and scope of the invention.

We claim:

1. An audio interface apparatus for use with a protective relay for an electrical power distribution system, said apparatus comprising:
   a. means for receiving an output signal from said protective relay, which output signal is representative of line current conditions at a predetermined location in said electrical power distribution system;
   b. means for converting said protective relay output signal into a first square wave signal;
   c. means for generating a first local signal having a first frequency within the audio band;
   d. means for generating a local audio bandwidth output signal for transmission to at least one remote audio bandwidth interface apparatus over an audio band communication channel, said local audio bandwidth output signal comprising said first local signal modulated by said first square wave;
   e. means for receiving, from said audio band communication channel, a remote signal comprising the local audio bandwidth output signal generated by at least one remote audio bandwidth interface apparatus;
   f. means for converting said remote signal into a second square wave signal;
   g. means for comparing the phase of said first square wave signal with the phase of said second square wave signal and generating a trip output signal when said phase comparison exceeds predetermined limits; and
   h. means for detecting faults in said audio band communication channel.

2. The audio bandwidth interface apparatus in accordance with claim 1 wherein said means for detecting faults in said audio band communication channel comprises:
   a. means for generating a second local signal having a second frequency within the audio band;
   b. means for mixing said second local signal into said local audio bandwidth output signal;
   c. means for detecting the absence of said second local signal in said received remote signal; and
   d. selectively generating a trip output signal when the absence of said second local signal from said received remote signal exceeds a predetermined period of time.

* * * * *